US009695295B2

(12) United States Patent
Ponticiello et al.

(10) Patent No.: US 9,695,295 B2
(45) Date of Patent: Jul. 4, 2017

(54) COMPOSITIONS OF SELF-EXTINGUISHING EXPANDABLE VINYL AROMATIC (CO)POLYMERS AND PROCESS FOR THEIR PREPARATION

(75) Inventors: Antonio Ponticiello, Mozzecane (IT); Dario Ghidoni, Gonzaga (IT); Attilio Arienti, Mantova (IT); Alessandra Simonelli, Mantova (IT)

(73) Assignee: Versalis S.p.A., San Donato Milanese (IT)

( * ) Notice: Subject to any disclaimer, the term of this patent is extended or adjusted under 35 U.S.C. 154(b) by 434 days.

(21) Appl. No.: 13/824,698

(22) PCT Filed: Sep. 20, 2011

(86) PCT No.: PCT/IB2011/002216
§ 371 (c)(1),
(2), (4) Date: May 7, 2013

(87) PCT Pub. No.: WO2012/038817
PCT Pub. Date: Mar. 29, 2012

(65) Prior Publication Data
US 2013/0225703 A1  Aug. 29, 2013

(30) Foreign Application Priority Data

Sep. 21, 2010 (IT) .......................... MI2010A001718

(51) Int. Cl.
C08J 9/00 (2006.01)
C08K 3/32 (2006.01)
C08K 5/02 (2006.01)
C08J 9/14 (2006.01)
C08J 9/16 (2006.01)
C08K 5/00 (2006.01)
C08K 5/3492 (2006.01)
C08K 5/52 (2006.01)
C09D 5/18 (2006.01)
C09D 7/12 (2006.01)
C08K 5/01 (2006.01)
C08K 5/05 (2006.01)
C08K 5/098 (2006.01)
C08K 5/14 (2006.01)

(52) U.S. Cl.
CPC .............. *C08K 5/02* (2013.01); *C08J 9/0019* (2013.01); *C08J 9/0066* (2013.01); *C08J 9/141* (2013.01); *C08J 9/16* (2013.01); *C08K 3/32* (2013.01); *C08K 5/0066* (2013.01); *C08K 5/01* (2013.01); *C08K 5/05* (2013.01); *C08K 5/098* (2013.01); *C08K 5/14* (2013.01); *C08K 5/34922* (2013.01); *C08K 5/34928* (2013.01); *C08K 5/5205* (2013.01); *C09D 5/18* (2013.01); *C09D 7/1241* (2013.01); *C08J 2325/06* (2013.01)

(58) Field of Classification Search
CPC ........ C08J 9/0019; C08J 9/0066; C08J 9/141; C08J 9/16; C08J 2325/06; C08K 3/32; C08K 5/0066; C08K 5/01; C08K 5/02; C08K 5/05; C08K 5/098; C08K 5/14; C08K 5/34922; C08K 5/34928; C08K 5/5205; C09D 5/18; C09D 7/1241
See application file for complete search history.

(56) References Cited

U.S. PATENT DOCUMENTS

| | | | |
|---|---|---|---|
| 2,857,341 A * | 10/1958 | Colwell ..................... | C08J 9/18 521/146 |
| 5,010,111 A | 4/1991 | Hahn et al. | |
| 5,043,218 A | 8/1991 | Hahn et al. | |
| 6,569,912 B1 * | 5/2003 | Oohara ................... | C08J 9/0019 521/146 |
| 6,696,504 B1 * | 2/2004 | Hayashi .................. | C08J 9/149 264/53 |
| 8,097,669 B2 * | 1/2012 | Knoll ...................... | C08L 53/02 524/101 |

(Continued)

FOREIGN PATENT DOCUMENTS

| | | |
|---|---|---|
| EP | 0 418 559 | 3/1991 |
| EP | 2 025 700 | 2/2009 |

(Continued)

OTHER PUBLICATIONS

International Search Repot Issued Aug. 16, 2012 in PCT/IB11/02216 Filed Sep. 20, 2011.

(Continued)

*Primary Examiner* — Irina S Zemel
(74) *Attorney, Agent, or Firm* — Oblon, McClelland, Maier & Neustadt, L.L.P.

(57) ABSTRACT

Compositions based on self-extinguishing expandable vinyl aromatic polymers in granules comprising: a. a polymeric matrix and, homogeneously englobed in the polymeric matrix, b. 3-10% by weight, calculated with respect to the polymer (a), of an expanding system; c. 0.005-5% by weight, calculated with respect to the polymer (a), of a brominated flame-retardant agent; d. 0.001-2% by weight, calculated with respect to the polymer (a), of a synergic additive; e. 0.005-5% by weight, calculated with respect to the polymer (a), of at least one stabilizing additive selected from: i. pyrophosphates of alkaline or alkaline earth metals, an ammonium group or a unit deriving from melamine; ii. melamine polyphosphate; iii. partially or completely salified polycarboxylic acids; iv. citrates of alkaline or alkaline earth metals; v. polyfunctional alcohols with 2 or more alcohol functions; vi. esters of poly-functional alcohols.

14 Claims, No Drawings

(56) References Cited

U.S. PATENT DOCUMENTS

2003/0191203 A1\* 10/2003 Oohara ............... C08J 9/0019
                                                                521/79
2011/0046249 A1     2/2011  Ponticiello et al.

FOREIGN PATENT DOCUMENTS

| RU | 2 283 323 C2 | 9/2006 |
| RU | 2 307 844 C2 | 10/2007 |
| WO | WO2009007370 | \* 1/2009 |
| WO | 2009 135695 | 11/2009 |
| WO | WO 2010/128369 A1 | 11/2010 |

OTHER PUBLICATIONS

Office Action issued Oct. 13, 2015 in Russian Patent Application No. 2013113928/05(020578) (with Partial English language translation).

\* cited by examiner

COMPOSITIONS OF SELF-EXTINGUISHING EXPANDABLE VINYL AROMATIC (CO)POLYMERS AND PROCESS FOR THEIR PREPARATION

The present invention relates to compositions of self-extinguishing expandable vinyl aromatic polymers and copolymers and the process for their preparation.

More specifically, the present invention relates to granules based on expandable vinyl aromatic polymers and copolymers, for example expandable (co)polymers of styrene, which contain a flame-retardant system with an improved thermal stability.

Even more specifically, the present invention also relates to the process for the preparation of compositions of expandable vinyl aromatic polymers and copolymers in granules containing a flame-retardant system which comprises additives capable of both regulating the cellular structure of the expanded polymer and improving the thermal stability of the flame-retardant agents (organobrominated compounds).

In the present description, all the operative conditions specified in the text should be considered as being preferred conditions even if not expressly declared.

Expandable vinyl aromatic polymers and copolymers, hereafter referred to as expandable vinyl aromatic polymers, and among these, in particular, expandable polymers and/or copolymers of styrene (EPS), are known products, long used for preparing articles which can be adopted in various applicative areas, among which, one of the most important is thermal insulation.

These articles are obtained by first swelling (expanding) the polymer granules, in a closed environment, impregnated with a low-boiling fluid, for example an aliphatic hydrocarbon such as pentane or hexane, and then molding the swollen particles contained inside a mould, by means of the contemporaneous effect of pressure and temperature. The swelling of the particles is generally effected with vapour, or another gas, maintained at a temperature slightly higher than the glass transition temperature (Tg) of the polymer.

As is well known among operators in the field and as already specified, expandable vinyl aromatic polymers and, among these, expandable polystyrene, are in the form of compact granules impregnated with the expanding agent and with a diameter of the granules generally ranging from 0.5 to 1.5 mm. A number of additives are also homogeneously dispersed inside the granules, for improving the performances of the same granules or articles obtained therefrom.

Among the additives incorporated inside the granules, there are flame-retardant additives. Last generation flame-retardant additives consist of at least one brominated organic product, for example hexabromocyclododecane, and a synergic agent comprising in the molecule at least one —O—O— or C—C thermolabile bond, for example dicumyl peroxide or bicumyl.

A process for the preparation of expandable vinyl aromatic polymers, such as expandable polystyrene, is the mass process or continuous mass process. In both of these processes, the molten polymeric mass obtained either by melting the granule of preformed polymer or directly using the molten polymeric mass as it comes from the production process and/or from the devolatilizer, is fed to a series of mixers where it is mixed with the expanding agent and with the required additives, for example the brominated flame-retardant additive and synergic agent.

The mixing phase of the additives requires relatively long times, to ensure a homogeneous dispersion of the same in the molten polymeric mass. As it is necessary to keep the melt at a high temperature, for example from 250 to 300° C., in order to have optimum conditions of fluidity and consequently miscibility, some of the additives however, and among these the brominated organic compound, tend to degrade and create undesired by-products which remain incorporated in the polymeric mass. The brominated organic compound also tends to release bromine or hydrobromic acid which may not only create problems of an environmental nature, but can also damage/corrode the mixing equipment. Furthermore, the decomposition of the brominated compound reduces the self-extinguishing properties of the material compelling the users to increase the quantity of this compound in the formulations.

The Applicant has now found a further additive, to be added to a vinyl aromatic polymer in the molten state, which is capable of inhibiting the degradation of brominated organic compounds, when they are subjected to a high temperature, without creating chemical/physical imbalance in the resulting expandable granules. In addition to this property, the additive described hereunder, allows the cell structure of the bead obtained after the expansion step, to be regulated.

An object of the present invention therefore relates to a composition based on self-extinguishing expandable vinyl aromatic polymers in granules comprising:

a. a polymeric matrix, comprising 50-100% by weight of one or more vinyl aromatic monomers and 0-50% by weight of a copolymerizable monomer and homogeneously englobed in the polymeric matrix,
b. 3-10% by weight, calculated with respect to the polymer (a), of an expanding system;
c. 0.005-5% by weight, calculated with respect to the polymer (a), of a flame-retardant agent consisting of a brominated hydrocarbon containing at least 30% by weight, preferably from 50 to 90% by weight, of bromine;
d. 0.001-2% by weight, calculated with respect to the polymer (a), of a synergic additive of the brominated flame-retardant containing a C—C or C—O—O—C thermolabile bond;
e. 0.005-5% by weight, calculated with respect to the polymer (a), of at least one additive capable of regulating the cell structure after expansion of the granule and inhibiting the thermal degradation of the brominated flame-retardant, selected from the combination of:
i. pyrophosphates having the general formula $X—P_2O_7$ wherein X represents an alkaline or alkaline earth metal, an ammonium group or a unit deriving from melamine;
ii. melamine polyphosphate;
iii. partially or completely salified polycarboxylic acids (for example polyacrylic acid);
iv. citrates of alkaline or alkaline earth metals;
v. polyfunctional alcohols with 2 or more alcohol functions;
vi. esters of polyfunctional alcohols (for example, glyceryl monostearate and/or glyceryl distearate).

The term vinyl aromatic polymers, as used in the present description and claims, refers to polymeric products having average molecular weight Mw ranging from 50,000 to 300,000, preferably from 70,000 to 220,000.

The vinyl aromatic polymers can be obtained by polymerizing a mixture of monomers which comprises 50-100% by weight, preferably 75-98% by weight, of one or more vinyl aromatic monomers and 0-50% by weight, preferably 2-25% by weight, of at least one copolymerizable monomer.

The vinyl aromatic monomers can be selected from those corresponding to the following general formula:

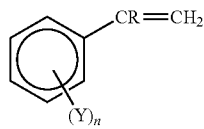

(I)

wherein R is a hydrogen or a methyl group, n is zero or an integer ranging from 1 to 5 and Y is a halogen, such as chlorine or bromine, or an alkyl or alkoxyl radical having 1 to 4 carbon atoms.

Examples of vinyl aromatic monomers having the general formula defined above, are:

styrene, α-methylstyrene, methylstyrene, ethylstyrene, butylstyrene, dimethylstyrene, mono-, di-, tri-, tetra- and penta-chlorostyrene, bromo-styrene, methoxystyrene, acetoxystyrene, etc. Preferred vinyl aromatic monomers are styrene and α-methylstyrene.

The vinyl aromatic monomers corresponding to general formula (I) can be used alone or in a mixture up to 50% by weight, preferably 2-25%, with other co-polymerizable monomers. Examples of these monomers are (meth)acrylic acid, $C_1$-$C_4$ alkyl esters of (meth)acrylic acid such as methyl acrylate, methyl methacrylate, ethyl acrylate, ethyl methacrylate, isopropyl acrylate, butyl acrylate, amides and nitriles of (meth)acrylic acid such as acrylamide, methacrylamide, acrylonitrile, methacrylonitrile, butadiene, ethylene, divinyl benzene, maleic anhydride, etc. Preferred co-polymerizable monomers are acrylonitrile, methyl methacrylate Flame-retardant agents particularly suitable for the present invention are brominated aliphatic, cycloaliphatic, aromatic compounds, for example $C_6$-$C_{18}$, such as hexabromocyclododecane (EBCD), pentabromomonochlorocyclohexane, pentabromophenyl allyl ether, bis-tetrabromobisphenol-A allyl ether, the latter known on the market as "Chemtura BE51", of the company Chemtura, etc. These products are present in the polymeric composition, object of the present invention, in preferred quantities ranging from 0.1 to 3% by weight.

Synergic products which can be used are dicumyl peroxide (DCP), cumene hydroperoxide, 3,4-dimethyl-3,4-diphenyl-hexane, 2,3-dimethyl-2,3-diphenyl butane, 3,6,9-triethyl-3,6,9-trimethyl-1,4,7-triperoxynonane, bicumyl, poly (1,4-diisopropylbenzene), etc. These products are present in the polymeric composition, object of the present invention, in preferred quantities ranging from 0.01 to 1% by weight.

Any expanding agent capable of being englobed in a polymeric matrix can be used in a combination with the vinyl aromatic materials used for producing the expandable composition, in granules, object of the present invention. Liquid substances with a boiling point ranging from 10 to 100° C., preferably from 20 to 80° C., are generally used. Typical examples are aliphatic or cyclo-aliphatic hydrocarbons containing 3 to 6 carbon atoms such as n-pentane, iso-pentane, cyclopentane or mixtures thereof; halogenated derivatives of aliphatic hydrocarbons containing from 1 to 3 carbon atoms, such as, for example, dichlorodifluoromethane, 1,2,2-trifluoroethane, 1,1,2-trifluoroethane; carbon dioxide and water.

In order to favour the retention of the expanding agent in the polymeric matrix, additives capable of forming bonds of both the weak type (for example hydrogen bridges) and strong type (for example acid-base adducts) can be used with the expanding agent. Examples of these additives are methyl alcohol, isopropyl alcohol, dioctylphthalate, dimethyl carbonate, derivatives containing an amine group.

If a vinyl aromatic-based expandable composition in granules is desired, which is capable of providing expanded beads with a reduced density and also with an improved thermal insulation capacity, after sintering the expanded beads into finished articles, one or more additives can be added to the vinyl aromatic-based composition, object of the present invention, selected from:

A. 0.01-25% by weight, calculated with respect to the polymer (a), preferably from 0.05 to 20%, more preferably from 0.1 to 10%, of a carbon black having an average diameter (d50), measured with a laser granulometer, ranging from 30 to 1,000 nm, a surface area, measured according to ASTM D-3037-89 (BET), ranging from 5 to 200 m$^2$/g, a sulfur content ranging from 0.1 to 100 ppm and an iodine number ranging from 5 to 40 mg/kg;

B. 0.01-10% by weight, calculated with respect to the polymer (a), preferably from 0.05 to 80, more preferably from 0.1 to 6%, of a natural, synthetic, expanded, expandable graphite in powder form having a maximum size (d50), measured with a laser granulometer, ranging from 0.05 to 100 μm, preferably from 1 to 13 μm, with a surface area, measured according to ASTM D-3037-89 (BET), of 5-20 m$^2$/g;

C. 0.01-10% by weight, calculated with respect to the polymer (a), of a carbon coke in particle form, having an average particle diameter (d50) ranging from 0.5 to 100 μm, preferably from 2 to 20 μm, and a surface area, measured according to ASTM D-3037-89 (BET), ranging from 5 to 200 m$^2$/g, preferably from 8 to 50 m$^2$/g.

Additives capable of modifying the cell structure after expansion of the polymeric granule and inhibiting the thermal degradation of the brominated flame-retardant, preferred according to the present invention, can be selected from:

i. tetrasodium pyrophosphate, used in an amount ranging from 0.01 to 3% by weight calculated with respect to the polymer (a);

ii. melamine polyphosphate having general formula (II):

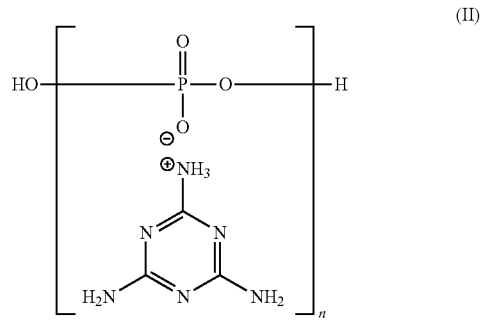

(II)

with n≥2, preferably ranging from 2 to 50. The melamine polyphosphate can be used in a quantity ranging from 0.01 to 3% by weight, calculated with respect to the polymer (a). Preferred melamine polyphosphate, according to the present invention, is characterized by a content of $P_2O_5$ ranging from 31 to 35% by weight and a nitrogen content ranging from 40 to 44% by weight. This additive is present as a powder with an average particle-size ranging from 6 to 10 μm;

iii. polyacrylic acid, with an average molecular weight Mw ranging from 20,000 to 200,000, preferably from 20,000 to 50,000, used in amounts ranging from 0.01 to 3% by weight, calculated with respect to the polymer (a), partially and/or completely salified with sodium or potassium;

iv. sodium citrate and potassium citrate, in a quantity ranging from 0.01 to 3% by weight, calculated with respect to the polymer (a).

Other additives capable of modifying the cell structure after expansion of the granule and inhibiting the thermal degradation of the brominated flame-retardant agent can be polyalcohols (v) such as pentaerythrol and dipentaerythrol or a mixture (vi) consisting of mono-, di-, tri-stearate of glycerin, both (v) and (vi) in a quantity ranging from 0.01 to 3% by weight, calculated with respect to the polymer (a).

Conventional additives, generally used with traditional vinyl aromatic polymers, such as pigments, stabilizing agents, antistatic agents, detaching agents, etc. can be added to the vinyl aromatic-based expandable compositions in granules, object of the present invention.

Furthermore, once sintered, the expanded beads allow expanded articles to be obtained, having a density ranging from 5 to 50 g/l, preferably from 10 to 25 g/l.

In particular, these expanded articles have an excellent thermal insulation capacity expressed by a thermal conductivity ranging from 25 to 50 mW/mK, preferably from 30 to 45 mW/mK. The thermal conductivity measurement is effected at 10° C. according to the method DIN 13163 on end-products obtained from blocks having a density of 15 g/l.

A further object of the present invention relates to a process for preparing in continuous mass, expandable vinyl aromatic-based compositions in granules, which comprises:
i. adding the additives (c)-(e) previously indicated to a vinyl aromatic (co)polymer in granules or already in the molten state, with an average molecular weight Mw ranging from 50,000 to 300,000, preferably from 70,000 to 220,000;
ii. optionally heating the vinyl aromatic polymer to a temperature higher than the relative melting point;
iii. incorporating the expanding agent (b) and possible other additives in the molten polymer, before extrusion through a die;
iv. mixing the polymeric composition thus obtained by means of static or dynamic mixing elements; and
v. granulating the composition thus obtained in a device which comprises a die, a cutting chamber and a cutting system.

At the end of the granulation, expandable granules having a substantially spherical form can be obtained, with an average diameter ranging from 0.2 to 2 mm.

According to the present invention, step (i) can be effected by feeding the polymeric granule already formed, possibly in a mixture with processing scraps, into an extruder. The single components are mixed therein and the polymeric part is subsequently melted and the additives and expanding agent are then added.

Alternatively, the polymer can be used already in the molten state, coming directly from the polymerization plant (in solution), in particular from the relative devolatilization unit. The molten polymer is fed to suitable devices, for example an extruder or a static mixer, where it is mixed with all the additives/components and then with the expanding agent, and it is subsequently extruded to give the expandable granulate, object of the present invention.

The granules of the polymeric composition can be re-cured at a temperature lower than or equal to the glass transition temperature (Tg) or slightly higher, for example the Tg increased by up to 8° C., possibly under pressure. A detailed method for preparing vinyl aromatic polymers in continuous mass, is described in international patent application WO 03/53651.

At the end of the polymerization process, the expandable granules obtained are subjected to pre-treatment which is normally applied to conventional expandable granules and which essentially consists in:
1. covering the granules with a liquid antistatic agent such as amines, ethoxylated tertiary alkylamines, ethylene oxide/propylene oxide copolymers, etc. Said agent allows the coating to adhere and facilitates the screening of the beads prepared in suspension;
2. applying the coating to said beads, said coating essentially consisting of a mixture of mono-, di-and tri-esters of glycerine (or other alcohols) with fatty acids, and metal stearates such as zinc and/or magnesium stearate.

Some illustrative and non-limiting examples are provided hereunder for a better understanding of the present invention and for its embodiment.

As previously indicated, brominated compounds such as, for example, hexabromocyclododecane, which give the polymers self-extinguishing properties, when subjected to high temperatures, indicatively higher than 180° C., can release hydrobromic acid as a result of thermal decomposition processes. The problem is particularly felt by producers of self-extinguishing polymers, as the acid developed corrodes the processing machines of the polymer and the decomposition of the brominated compound reduces the self-extinguishing properties of the material, compelling the producer to increase the quantity of brominated additive in the formulation.

When using the additives, object of the present invention, a marked stabilizing effect with respect to the organobrominated compounds added to the polymer as flame-retardant agents, has also been observed. The dosage of the additives indicated above has led to a significant prolonging of the release times of HBr which is released due to the thermal degradation of the organobrominated agent. Furthermore, in the presence of new additives, a significant reduction in the quantity of acid produced has also been observed.

This aspect is extremely important as it allows corrosion phenomena of the production plants, for example EPS, to be drastically reduced during the preparation of the products with self-extinguishing properties. The evaluation of the initial release time of HBr was effected according to the method described hereunder.

The sample is placed in a 10 ml sealed vial, heated to the temperature selected and subjected to a stream of nitrogen (60 ml per minute) which removes the hydrobromic acid possibly released.

The nitrogen flow carries the hydrobromic acid (and other decomposition products of the sample) into an aqueous solution which is basic due to sodium hydroxide and whose pH is measured by means of a glass electrode connected to an automatic Metrohm 736 GP glass titrator arranged with a burette filled with a solution of NaOH with a known titre.

The acid in gas phase, carried by the nitrogen flow, neutralizes the sodium hydroxide and lowers the pH of the solution. The titrator activates the burette by supplying NaOH to such a degree as to keep the pH constant. The volume of titrating product is registered in continuous by means of a computer. The quantity of hydrobromic acid released by the sample is obtained from the volume and titre of the NaOH solution used.

EXAMPLE 1

80 parts of polystyrene N1782 (Polimeri Europa); 20 parts of Calcinated Carbon Coke 4023 produced by Asbury are mixed in a twin-screw extruder. The extruded product is used as material concentrate in the production of the expandable composites of the present invention.

89.8 parts of ethylbenzene, 730.0 parts of styrene, 56.2 parts of α-methylstyrene and 0.2 parts of divinylbenzene are fed to a stirred reactor.

123.8 parts of the concentrate prepared as indicated above are fed to the reactor and dissolved (total: 1,000 parts). The reaction is carried out at 125° C. with an average residence time of 2 hours. The fluid composition at the outlet is then fed to a second reactor where the reaction is completed at 135° C. with an average residence time of 2 hours.

The reactive polymeric composition, having a conversion of 72%, is heated to 240° C. and subsequently fed to the devolatilizer to remove the solvent and residual monomer. The resulting composition has a glass transition temperature of 104° C., a melt flow index (MFI 200° C., 5 kg) of 8 g/10', a molecular weight Mw of 200,000 g/mol and a Mw/Mn ratio of 2.8, wherein Mw is the weight average molecular weight and Mn is the number average molecular weight.

The composition thus obtained is collected in a heated tank and fed to a heat exchanger to lower its temperature to 190° C.

126 parts of polystyrene N2982 (Polimeri Europa), 15.7 parts of HBCD Saytex HP 900 (hexabromocyclododecane, sold by Albemarle) and 5.2 parts of Perkadox 30 (2,3-dimethyl-2,3-diphenylbutane, sold by Akzo Nobel) and 3.1 parts of tetrasodium pyrophosphate sold by the company Budenheim (total: 150 parts), are fed to a twin-screw extruder. A gear pump increases the feeding pressure of the molten additive to 260 bar. 47 parts of a mixture of n-pentane (75%) and iso-pentane (25%) are then pressurized and injected into the feeding of the additive. The mixing is completed with the use of static mixers, at a temperature of about 190° C.

The composition thus mixed is added to 850 parts of the composition coming from the heat exchanger. The ingredients are then mixed by means of static mixing elements for a calculated average time (residence) of 7 minutes. The composition is then distributed to the die, where it is extruded through a number of holes having a diameter of 0.5 mm, immediately cooled with a jet of water and cut with a series of rotating knives (according to patent application US 2005/0123638). The granulation pressure is 5 bar and the shear strain rate is selected so as to obtain granules having an average diameter of 1.2 mm. The water is used as a liquid spray and nitrogen is used as carrier gas. The ratio between the flow-rate of the water sprayed and the flow-rate of the polymeric mass is 30 and the ratio between the nitrogen and polymeric mass is 20. The temperature of the water is 40° C.

The resulting granulated beads are dried with a centrifugal drier and then covered with a coating. The coating is prepared by adding 3 parts of glyceryl monostearate, 1 part of zinc stearate and 0.2 parts of glycerine per 1,000 parts of granulated beads dried. The coating additives are mixed with the granulate by means of a continuous worm-screw mixer. The beads are then expanded and moulded.

The thermal conductivity of the end-products obtained proved to be 34.7 mW/mK at 16 g/l (according to the method ISO 8301). Some sheets obtained from the end-products were introduced into an oven at 70° C. for 2 days: test samples were then collected (9 cm×19 cm×2 cm) for the fire behaviour test according to the standard DIN 4102. The test-samples passed the test.

The expandable beads thus obtained are analyzed to quantify the bromides present in the polymer. The bromide content in the EPS beads is an index of the degradation undergone by the organobrominated agent introduced into the polymer as flame-retardant.

The EPS beads thus obtained have 10 ppm of bromides whereas the release time of the HBr measured at 190° C. according to the method described above is 5,000 seconds.

The cell structure evaluated on the expanded end-products proved to be homogeneous.

COMPARATIVE EXAMPLE 1

Example 1 was repeated, without the dosage tetrasodium pyrophosphate.

As described in the previous example, the polymeric composition containing calcined coke is collected in a tank and cooled to a temperature of 190° C. 129.1 parts of polystyrene N2982, 15.7 parts of HBCD Saytex HP 900 and 5.2 parts of Perkadox 30 (total: 150 parts) are then dosed in a twin-screw extruder. 47 parts of expanding agent consisting of a mixture of n-pentane (75%) and iso-pentane (25%) are subsequently added. The composition thus obtained is added to 850 parts of the polymeric composition, as in Example 1. The mixture obtained then reaches the die where expandable granulates with an average diameter of about 1.2 mm are obtained. These granules are then dried and treated with the coating. The types and quantity of coating additives used are the same as those of Example 1.

The beads produced are expanded and moulded.

The thermal conductivity of the end-products obtained proved to be 34.7 mW/mK at a density of 16 g/l. Some sheets obtained were introduced into an oven at 70° C. for 2 days: test samples were then collected (9 cm×19 cm×2 cm) for the fire behaviour test according to the standard DIN 4102. The test-samples passed the test.

The analysis, effected on the dried EPS beads and without a coating, confirms the presence of 300 ppm of bromides. The release starting time of HBr proved to be 430 seconds.

The expanded end-products have a non-homogeneous cell structure.

EXAMPLE 2

Example 1 was repeated, substituting the tetrasodium pyrophosphate with melamine polyphosphate (0.4% by weight) having an average content of $P_2O_5$ of 32%. 124.9 parts of polystyrene N2982, 15.7 parts of HBCD Saytex HP 900 and 5.2 parts of Perkadox 30 and 4.2 parts of melamine polyphosphate Budit 3141 sold by Budenheim (total: 150 parts) are then dosed in a twin-screw extruder.

The expanding agent is subsequently dosed and the composition thus mixed is added to 850 parts of the polymeric composition coming from the heat exchanger, as indicated in Example 1.

This composition then reaches the die. In this way, expandable granulates with an average diameter of about 1.2 mm are produced. The expandable polymer beads are dried and the coating powders are added. The coating additives and quantities dosed are those indicated in Example 1. The granulates produced are expanded and moulded.

The end-products obtained have a thermal conductivity of 34.4 mW/mK at a density of 16.2 g/l.

A series of test samples collected from the expanded end-products (9 cm×19 cm×2 cm) were conditioned in an oven at 70° C. for 2 days and subjected to the fire behaviour test according to the standard DIN 4102. The test-samples passed the test. The analysis, effected on the dried EPS beads and without a coating, confirms the presence of 35 ppm of bromides. The release starting time of HBr proved to be 6,000 seconds.

The cell structure evaluated on the expanded end-products proved to be homogeneous.

EXAMPLE 3

Example 1 was repeated, substituting the tetrasodium pyrophosphate with 0.5% by weight of polyacrylic acid partially salified with sodium.

123.9 parts of polystyrene N2982, 15.7 parts of HBCD Saytex HP 900, 5.2 parts of Perkadox 30 and 5.2 parts of polyacrylic acid partially salified with sodium sold by the company Carlo Erba (total: 150 parts) are then dosed in a twin-screw extruder. The expanding agent is subsequently dosed and the composition thus obtained is mixed with 850 parts of the polymeric composition coming from the heat exchanger, as indicated in Example 1.

The EPS beads produced are then dried and the coating additives are added, as in the previous examples. The granulates produced are expanded and moulded.

The end-products obtained have a thermal conductivity of 34.4 mW/mK at a density of 16 g/l.

After conditioning some test samples (9 cm×19 cm×2 cm) collected from the expanded end-products in an oven at 70° C. for 2 days, the test samples are subjected to the fire behaviour test according to the standard DIN 4102. The test-samples passed the test. The analysis, effected on the dried EPS beads and without a coating, confirms the presence of 28 ppm of bromides. The release starting time of HBr proved to be 4,500 seconds.

The cell structure evaluated on the expanded end-products proved to be homogeneous.

EXAMPLE 4

Example 1 was repeated, substituting the tetrasodium pyrophosphate with 0.2% of a mixture of mono-, di-, tri-stearate of glycerin. In this case, 127 parts of polystyrene N2982, 15.7 parts of HBCD Saytex HP 900, 5.2 parts of Perkadox 30 and 2.1 parts of a mixture of mono-, di-, tri-stearate of glycerin sold by the company Sogis (total: 150 parts) are then dosed in a twin-screw extruder.

The EPS beads thus produced were dried and treated with the coating, as described in the previous examples. The granulates produced are expanded and moulded.

The end-products obtained have a thermal conductivity of 34.8 mW/mK at a density of 16.4 g/l.

After conditioning some test samples (9 cm×19 cm×2 cm) collected from the expanded end-products in an oven at 70° C. for 2 days, the test samples are subjected to the fire behaviour test according to the standard DIN 4102. The test-samples passed the test. The analysis, effected on the dried EPS beads and without a coating, confirms the presence of 50 ppm of bromides. The release starting time of HBr proved to be 4,000 seconds.

The cell structure evaluated on the expanded end-products proved to be homogeneous.

EXAMPLE 5

Example 1 was repeated, substituting the tetrasodium pyrophosphate with 0.25% of sodium citrate. 126.5 parts of polystyrene N2982, 15.7 parts of HBCD Saytex HP 900, 5.2 parts of Perkadox 30 and 2.6 parts of sodium citrate supplied by the company Carlo Erba (total: 150 parts) are then dosed in a twin-screw extruder.

The EPS beads thus produced were dried and treated with the coating, as described in the previous examples. The granulates produced are expanded and moulded.

The end-products obtained have a thermal conductivity of 34.4 mW/mK at a density of 16.3 g/l.

After conditioning some test samples (9 cm×19 cm×2 cm) collected from the expanded end-products in an oven at 70° C. for 2 days, the test samples are subjected to the fire behaviour test according to the standard DIN 4102. The test-samples passed the test.

The analysis, effected on the dried EPS beads and without a coating, confirms the presence of 40 ppm of bromides. The release starting time of HBr proved to be 4,200 seconds.

The cell structure evaluated on the expanded end-products proved to be homogeneous.

The invention claimed is:

1. A composition, based on a self-extinguishing expandable vinyl aromatic polymer in granules, the composition consisting of:
   a polymeric matrix produced by a mass polymerization or a continuous mass polymerization process, comprising 50-100% by weight of a vinyl aromatic monomer and 0-50% by weight of a copolymerizable monomer; and homogeneously englobed in the polymeric matrix;
   3-10% by weight, calculated with respect to the polymeric matrix, of an expanding system consisting of at least one substance selected from the group consisting of aliphatic or cyclo-aliphatic hydrocarbons containing 3-6 carbon atoms, halogenated derivatives of an aliphatic hydrocarbons containing 1-3 carbon atoms, and carbon dioxide;
   0.005-5% by weight, calculated with respect to the polymeric matrix, of a brominated flame-retardant comprising a brominated hydrocarbon comprising at least 30% by weight of bromine;
   0.001-2% by weight, calculated with respect to the polymeric matrix, of a synergic additive of the brominated flame-retardant comprising a C—C or C—O—O—C thennolabile bond; and
   0.005-5% by weight, calculated with respect to the polymeric matrix, of a first additive,
   wherein the first additive is capable of regulating cell structure after expansion of the granules and inhibiting thermal degradation of the brominated flame-retardant, and
   wherein the first additive is
   a partially or completely salified polycarboxylic acid.

2. The composition according to claim 1,
   wherein the vinyl aromatic polymer has a weight average molecular weight of from 50,000 to 300,000.

3. The composition according to claim 1,
   wherein the brominated flame-retardant is selected from the group consisting of a brominated aliphatic compound, a brominated cycloaliphatic compound, and a brominated $C_6$-$C_{18}$ aromatic compound.

4. The composition according to claim 1,
   wherein the synergic additive is at least one selected from the group consisting of dicumylperoxide (DCP), cumene hydroperoxide, 3,4-dimethyl-3,4-diphenyl hexane, 2,3-dimethyl-2,3-diphenyl butane, 3,6,9-triethyl-3,6,9-trimethyl-1,4,7-triperoxynonane, and bicumyl, poly(1,4-diisopropylbenzene).

5. The composition according to claim 1,
wherein the first additive comprises, as the partially or completely salified polycarboxylic acid, polyacrylic acid partially and/or completely salified with sodium or potassium, and the polyacrylic acid has an average molecular weight of from 20,000 to 200,000 in an amount of from 0.01 to 3% by weight, calculated with respect to the polymeric matrix.

6. An expanded article having a density of from 5 to 50 g/l obtained from sintering, after expansion, of the granules comprising the composition of claim 1.

7. A process for preparing the composition according to claim 1, in continuous mass, the process comprising:
adding the brominated flame-retardant, the synergic additive, and the first additive to a vinyl aromatic polymer or a vinyl aromatic copolymer produced by a mass polymerization or a continuous mass polymerization process, in granule form or already in a molten state, having an average molecular weight of from 50,000 to 300,000;
optionally heating the vinyl aromatic polymer or the vinyl aromatic copolymer to a temperature higher than a relative melting point, thereby obtaining a molten polymer;
incorporating the expanding system and possibly other additives in the molten polymer, before extrusion through a die, thereby obtaining a polymeric composition;
mixing the polymeric composition with a static or dynamic mixing element; and
granulating the polymeric composition in a device comprising a die, a cutting chamber, and a cutting system.

8. The process according to claim 7,
wherein, at an end of the granulating, expandable granules are obtained in a spherical form having an average diameter of from 0.2 to 2 mm.

9. The composition according to claim 1,
wherein the brominated flame-retardant comprises the brominated hydrocarbon comprising from 50 to 90% by weight of bromine, calculated with respect to the polymeric matrix.

10. The process according to claim 7,
wherein an average molecular weight of the vinyl aromatic polymer or the vinyl aromatic copolymer is from 70,000 to 220,000.

11. The composition according to claim 1,
wherein the expanding system consists of at least one liquid substance with a boiling point ranging from 20° C. to 80° C.

12. The composition according to claim 11,
wherein the expanding system consists of at least one liquid substance selected from the group consisting of aliphatic or cycloaliphatic hydrocarbons containing 3 to 6 carbon atoms, or at least one liquid substance selected from the group consisting of halogenated derivatives of aliphatic hydrocarbons containing 1 to 3 carbon atoms.

13. The composition according to claim 11,
wherein the expanding system consists of at least one liquid substance selected from the group consisting of aliphatic or cycloaliphatic hydrocarbons containing 3 to 6 carbon atoms.

14. The composition according to claim 11,
wherein the expanding system consists of at least one liquid substance selected from the group consisting of halogenated derivatives of aliphatic hydrocarbons containing 1 to 3 carbon atoms.

* * * * *